United States Patent
Ambrose

[11] 3,724,009
[45] Apr. 3, 1973

[54] SEAT BUN PULL STRIPS

[75] Inventor: Jere B. Ambrose, Pontiac, Mich.

[73] Assignee: Northern Fibre Products Company, Birmingham, Mich.

[22] Filed: May 18, 1971

[21] Appl. No.: 144,099

[52] U.S. Cl............................................5/360, 5/345
[51] Int. Cl................................................A47c 27/22
[58] Field of Search..........5/345, 351, 354, 355, 360, 5/361

[56] References Cited

UNITED STATES PATENTS

| | | | |
|---|---|---|---|
| 3,283,346 | 11/1966 | Marsh et al | 5/361 |
| 3,287,750 | 11/1966 | Jessup | 5/355 |
| 3,270,394 | 9/1966 | Marsh et al | 29/91.1 |

*Primary Examiner*—Casmir A. Nunberg
*Attorney*—Cullen, Settle, Sloman & Cantor

[57] ABSTRACT

A pull strip for rolling and curving the edge of a box-like shaped foamed rubber-like seat cushion bun and securing the bun to a support platform, the strip being formed of a uniform width, narrow, flexible, cloth-like sheet, having a narrow, permanently tacky adhesive stripe on one face and only along one edge thereof for adhering the striped portion to an upper surface of the bun with the remainder of the strip extending outwardly of and along the bun edge, for manually pulling the free edge of the strip around the bun edge and securing it to the platform.

2 Claims, 9 Drawing Figures

PATENTED APR 3 1973 3,724,009

INVENTOR.
JERE B. AMBROSE.
BY
CULLEN, SETTLE, SLOMAN & CANTOR
ATT'YS.

SEAT BUN PULL STRIPS

BACKGROUND OF INVENTION

Certain types of chairs, sofas, automotive vehicle seats, and the like furniture, are manufactured with cushions formed of foamed rubber or plastic fastened upon a support platform which may be in the form of a bottom frame or a board-like panel. The cushion is formed of a flat, box-like shaped bun which is either cut or molded to shape with relatively sharp corners and flat edges.

Frequently, one or more of these bun edges, particularly the leading or outward edge, is rolled or curved in cross-section by means of fastening a heavy, burlap-type cloth to the upper surface of the bun and then manually pulling the cloth around the bun edge and fastening it to the support platform. This rolls or curves the edge, by compressing the plastic, as well as simultaneously fastening the bun to the platform.

Generally, this type of cloth is fastened to the bun by means of manually painting an adhesive or a suitable solvent upon the bun surface, and then applying the cloth thereto for fastening.

A number of disadvantages have been found in this type of construction. One is that under ordinary production conditions, it is not possible to uniformly spread the adhesive or cement or solvent upon the bun thus making it somewhat lumpy, with a non-uniform connection between the bun and the cloth. Since the bun is compressed each time the article of furniture is sat upon, when the weight is removed, tension is placed upon the cloth by the expanding bun which returns to its normal expanded condition, thus, tending to loosen the cloth so that it wrinkles and ultimately disengages from the bun.

Another problem found is that the rough cloth which traditionally is formed of burlap or heavily woven materials similar to burlap, frictionally engages the furniture cover material which covers it and the bun, and also frictionally engages the bun surface, tending to wear both excessively, as well as causing wrinkles and loosening of the parts.

Another disadvantage found is that considerable time and labor is involved in applying the adhesives and permitting them to adequately dry and set in the manufacturing process, thus increasing labor costs as well as costs for the equipment needed for the purpose of setting the adhesives. There are other disadvantages and problems arising from this construction, as well as those mentioned above.

Hence, the invention herein relates to an improved pull strip and method of applying it which eliminates or substantially reduces the disadvantages and problems found in conventional constructions.

SUMMARY OF INVENTION

The invention herein relates to forming a pull strip out of a relatively slippery or smooth cloth, having a permanently tacky adhesive stripe formed on one face and along one edge thereof, wherein assembly of the chair parts requires simply placing the bun upon its support platform, while either immediately before or immediately thereafter, attaching the strip to the upper surface edge of the bun by simply pressing it into place and thereafter, pulling the free edge of the strip to roll and curve the bun edge, followed by fastening the free edge of the strip to the support platform, for securing the parts together.

This eliminates the time consuming application of adhesive by hand, eliminates the conventional setting times required, and by using the more slippery surface material contrary to the practice of the art, forms a better and more uniform roll or curve and eliminates wrinkling of the seat cover fabric and of the flexing cushion bun.

These and other objects and advantages of this invention will become apparent upon reading the following description, of which the attached drawings form a part.

DETAILED DESCRIPTION

Figure 1:
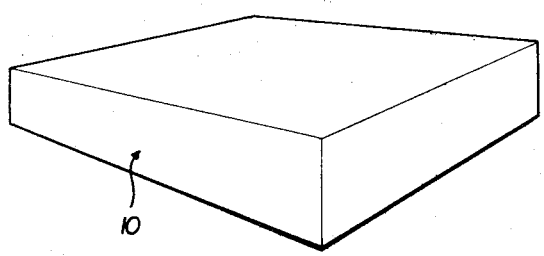
FIG. 1 is a perspective view of a seat cushion bun.

FIG. 1 illustrates a conventional seat cushion bun 10, such as is used for a furniture seat. The bun is formed of a suitable foamed plastic or foamed rubber-like material and is either molded or cut into its generally flattened, box-like shape.

Figure 2:
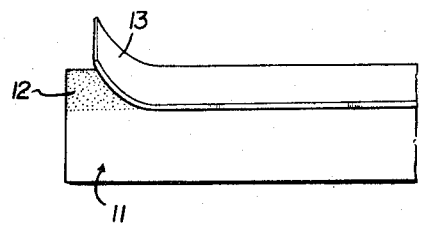
FIG. 2 is an elevational view, of the rear or lower face of the pull strip herein.
Figure 3:
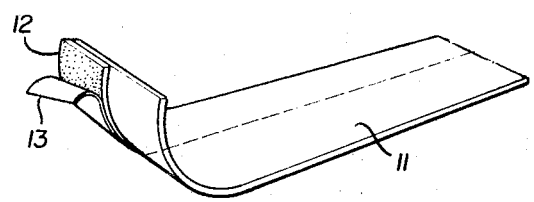
FIG. 3 is a perspective view of the pull strip.

Referring to FIGS. 2 and 3, the pull strip 11 is preformed from flexible, cloth-like material cut into a long strip of a predetermined width. Although conventional burlap or similar heavy textured, wide weave material may be used, preferably the strip is formed of a relatively smooth surfaced cloth. The preferable cloth is non-woven material formed of randomly oriented fine fibers of polypropylene which are previously linearly oriented for increased strength. The fibers are felted together to form the non-woven cloth. Such cloth is relatively smooth or slippery surfaced and has considerable strength and stretch resistance in all directions, far in access of conventional woven burlap-type cloths. In addition, it will not absorb moisture and resists wrinkling.

The cloth strip is provided with a narrow adhesive stripe 12, on one of its faces and along one of its long edges. The adhesive stripe is continuous and of uniform thickness and width. It is formed of a permanently tacky adhesive or cement which is characterized by being adherable to the bun material.

As illustrated in FIG. 2, the width of the stripe is considerably less than one half of the width of the cloth strip, and may be on the order of less than a quarter of the width of the strip.

The adhesive stripe is covered with a protective cover band 13, which is easily manually removable to expose the adhesive when desired. Thus, the pull strip may be manufactured in large rolls with appropriate lengths cut off the rolls during the manufacture of the furniture.

Figure 4:
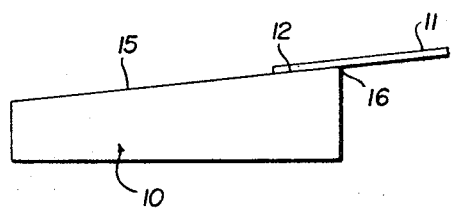
FIG. 4 is a side elevational view of the bun with the strip applied.
Figure 5:
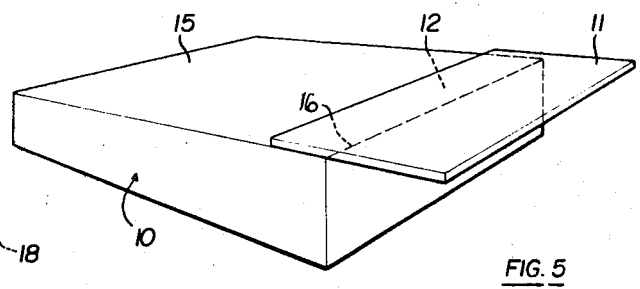
FIG. 5 is a perspective view of the bun with the pull strip, prior to forming the roll edge.
Figure 8:
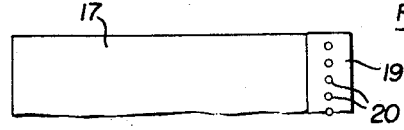
FIG. 8 is a bottom plan view taken in the directions of arrows 8—8 of FIG. 7.
Figure 7:
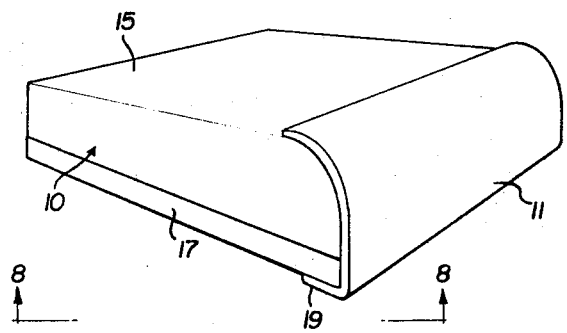
FIG. 7 is a perspective view with the pull strip positioned to form the roll edge.

In manufacturing the furniture, a length of strip is cut to size and then is fastened to the upper surface 15 of the bun along its upper edge 16 by means of removing the cover band 13 and simply pressing the adhesive stripe 12 against the surface of the bun. As illustrated in FIGS. 4 and 5, only the striped portion of the cloth strip is adhered to the bun surface, with the remainder of the strip extending outwardly, beyond, and in a generally horizontal direction relative to the bun.

The bun is then placed upon a support platform 17 which may be of a wood or metal framework or simply a board-like panel. The strip 11 may be applied to the bun either before or after the bun is rested upon the support platform.

Figure 6:
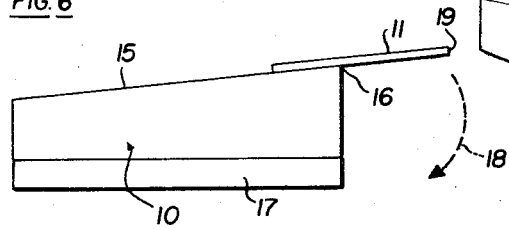
FIG. 6 is a side elevational view showing the assembly of the bun support and strip.

Thereafter, as indicated by the arrow 18 in FIG. 6, the free edge 19 of the strip is manually pulled downwardly and around the edge of the bun and the corresponding edge of the support platform to which it is fastened by suitable fasteners, such as tacks 20 or the like. This compresses and curves or rolls the edge of the bun into its curved or rolled cross-section which is maintained by the strip.

Figure 9:
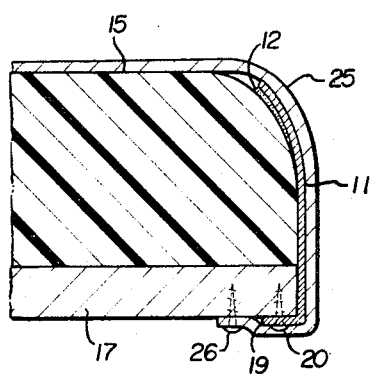
FIG. 9 is an enlarged, fragmentary, cross-sectional view of the seat edge.

Depending upon the design of the furniture piece, one or more of the bun edges may be fastened to the support in the manner described above. Thereafter, the finish cloth covering 25 is upholstered upon the bun-platform assembly in the conventional manner, i.e., by tacks 26 (see FIG. 9).

When the cushion is compressed due to the weight of a person sitting upon the seat, the strip flexes. When the weight is removed, the cushion springs up, placing the strip under tension in its transverse (vertical) direction. The strip maintains the shape of the curved or rolled edge of the cushion and its relatively slippery or smooth surface permits relative movement of the furniture cover material, as well as the bun material, to reduce or avoid wrinkling and to take the tension force off of the furniture cover material.

Having fully described an operative embodiment of this invention, I now claim:

1. A seat cushion bun pull strip for rolling and curve forming the edge of a flattened box-like foamed plastic seat cushion bun and for fastening the bun to a support platform comprising:
    an elongated, narrow strip, of a predetermined uniform width, formed of a flexible cloth-like material and having a lower face and an opposite upper face;
    a narrow stripe of a permanent tacky adhesive, characterized by being adherable to the plastic forming the bun, extending continuously along the full length of said strip lower face along one edge thereof and being of a uniform width which is considerably less than one-half of the width of the strip;
    said adhesive stripe being covered with a removable, protective cover band;
    wherein upon removal of said band, the stripe may be adhered against the upper surface of the bun parallel to and along one edge thereof, with the remainder of the strip arranged parallel to, but extending outwardly beyond the bun edge, so that it may be manually pulled around the bun edge and its free edge may be fastened to an exposed surface of a rigid support platform upon which the bun is placed for simultaneously compressing the bun edge and rolling it into and holding it in a curved cross-sectional shape and fastening the bun to the platform;
    and said strip being formed of a randomly oriented non-woven thin cloth made of short lengths of fine, linearly oriented, polypropylene fibers felted together to form said cloth, and the upper and lower surfaces of the strip being relatively smooth for providing a relatively low friction between the strip and seat cover cloth placed over the bun and between the strip and the bun.

2. A seat cushion bun pull strip for rolling and curve forming the edge of a flattened box-like foamed plastic seat cushion bun and for fastening the bun to a support platform comprising:
    an elongated, narrow strip, of a predetermined uniform width, formed of a flexible cloth-like material and having a lower face and an opposite upper face;
    a narrow stripe of adhesive, characterized by being adherable to the plastic forming the bun, extending continuously along the full length of said strip lower face along one edge thereof and being of a uniform width which is considerably less than one-half of the width of the strip;
    wherein the stripe may be adhered against the upper surface of the bun parallel to and along one edge thereof, with the remainder of the strip arranged parallel to, but extending outwardly beyond the bun edge, so that it may be manually pulled around the bun edge and its free edge may be fastened to an exposed surface of a rigid support platform upon which the bun is placed for simultaneously compressing the bun edge and rolling it into and holding it in a curved cross-sectional shape and fastening the bun to the platform;
    and said strip being formed of a randomly oriented non-woven thin cloth made of short lengths of fine, linearly oriented, polypropylene fibers felted together to form said cloth, and the upper and lower surfaces of the strip being relatively smooth for providing a relatively low friction between the strip and seat cover cloth placed over the bun and between the strip and the bun.

* * * * *